(12) United States Patent
Cho et al.

(10) Patent No.: US 9,367,761 B2
(45) Date of Patent: Jun. 14, 2016

(54) ELECTRONIC DEVICE AND OBJECT RECOGNITION METHOD IN ELECTRONIC DEVICE

(71) Applicant: Samsung Electronics Co., Ltd., Suwon-si, Gyeonggi-do (KR)

(72) Inventors: Ik-Hwan Cho, Suwon-si (KR); Gennadiy Yaroslavovich Kis, Kyiv (UA); Kyu-Sung Cho, Suwon-si (KR); Oleksiy Seriovych Panfilov, Kiev (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 14/177,777

(22) Filed: Feb. 11, 2014

(65) Prior Publication Data

US 2014/0233799 A1 Aug. 21, 2014

Related U.S. Application Data

(60) Provisional application No. 61/765,475, filed on Feb. 15, 2013.

(30) Foreign Application Priority Data

Dec. 30, 2013 (KR) .......................... 10-2013-0166718

(51) Int. Cl.
*G06K 9/00* (2006.01)
*G06K 9/62* (2006.01)
*G06F 17/30* (2006.01)
*H04N 5/225* (2006.01)

(52) U.S. Cl.
CPC ........ *G06K 9/6201* (2013.01); *G06F 17/30256* (2013.01); *G06K 9/00671* (2013.01); *G06K 9/00704* (2013.01); *G06K 9/00979* (2013.01)

(58) Field of Classification Search
CPC .................................. G06K 9/00; G06F 17/00
USPC .......... 382/103, 107, 236; 348/169, 170, 171, 348/172, 352
See application file for complete search history.

(56) References Cited

U.S. PATENT DOCUMENTS

| | | | | |
|---|---|---|---|---|
| 8,594,757 B2* | 11/2013 | Boppart | ................. | A61B 3/102 600/160 |
| 8,620,055 B2* | 12/2013 | Barratt | ................. | G06T 7/0032 378/21 |
| 8,644,910 B2* | 2/2014 | Rousso | ............. | A61B 5/02755 250/370.09 |
| 2009/0196510 A1 | 8/2009 | Gokturk et al. | | |
| 2009/0238460 A1 | 9/2009 | Funayama et al. | | |
| 2012/0046072 A1* | 2/2012 | Choi et al. | ................. | 455/556.1 |

FOREIGN PATENT DOCUMENTS

| | | |
|---|---|---|
| KR | 10-2009-0074690 A | 7/2009 |
| WO | 2008/001265 A1 | 1/2008 |

OTHER PUBLICATIONS

Mikolajczyk et al.; A Performance Evaluation of Local Descriptors; IEEE Transactions on Pattern Analysis and Machine Intelligence; vol. 27, No. 10; Oct. 27, 2005.

* cited by examiner

*Primary Examiner* — Abolfazl Tabatabai
(74) *Attorney, Agent, or Firm* — Jefferson IP Law, LLP (57) ABSTRACT

An electronic device for fast object recognition is provided. The electronic device includes a first storage unit configured to store digital image data, and a processor configured to recognize an object in first image data, to receive a second object related to the first object in the first image data from a second storage unit, to store the first and second objects in the first storage unit, and to use one or more of the first and second objects stored in the first storage unit to recognize an object in second image data.

19 Claims, 10 Drawing Sheets

ELECTRONIC DEVICE AND OBJECT RECOGNITION METHOD IN ELECTRONIC DEVICE

CROSS-REFERENCE TO RELATED APPLICATION(S)

This application claims the benefit under 35 U.S.C. §119 (e) of a U.S. Provisional application filed on Feb. 15, 2013 in the U.S. Patent and Trademark Office and assigned Ser. No. 61/765,475, and under 35 U.S.C. §119(a) of a Korean patent application filed on Dec. 30, 2013 in the Korean Intellectual Property Office and assigned Serial number 10-2013-0166718, the entire disclosure of each of which is hereby incorporated by reference.

TECHNICAL FIELD

The present disclosure relates to an electronic device and an object recognition method in the electronic device. More particularly, the present disclosure relates to an electronic device and an object recognition method in the electronic device that enables fast object recognition from image data.

BACKGROUND

Augmented Reality (AR) is a technology that provides a view of reality augmented by a virtual object. AR is also referred to as Mixed Reality (MR) because it provides an image resulting from a combination of the real world with a virtual world that has real-time additional information. Although AR is related to a concept in which the real world is supplemented by a virtual world that uses computer-generated virtual environments, the main environment in AR is the real-world environment. The computer-generated virtual environments provide additional information for the real-world environment. By contrast, virtual reality replaces the real world with a simulated one, and the user cannot see the real-world environment. Compared with the virtual reality technology, the AR technology can give a better reality with additional information for the user to better understand the real-world environment.

To provide AR, reference image data is used to recognize an object in image data received by a camera, and the reference image data may be learned image data stored in a database. With respect to data recognition, a lot of communication and processing resources are used for object recognition in in the context of electronic devices (e.g., camera phones, mobile phones, etc.) or distributed networks. Although, for object recognition, a scheme for quickly and efficiently matching local feature descriptors among numerous reference images (e.g., learned images) is desired, successful localization is not possible without feature classification.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and object recognition method in the electronic device that enables fast object recognition from image data.

In accordance with an aspect of the present disclosure, an electronic device is provided. The electronic device includes a first storage unit configured to store digital image data, and a processor configured to recognize an object in first image data, to receive a second object related to the first object in the first image data from a second storage unit and store the first and second objects in the first storage unit, and to use one or more of the first and second objects stored in the first storage unit to recognize an object in second image data.

In accordance with another aspect of the present disclosure, an electronic device is provided. The electronic device includes a processor configured to process first image data, to send the first image data to an external electronic device configured to have a first database, to recognize a first object in the first image data, and to send information indicating a second database smaller than the first database to the external electronic device.

In accordance with another aspect of the present disclosure, an electronic device is provided. The electronic device includes a processor configured to process image data, to receive first image data and information indicating a first database from an external electronic device, to search a second database greater than the first database for a second object related to a first object in the first image data and store the second object in the first database, to store the first object in the first database, and to use one or more of the first and second objects stored in the first database to recognize an object in second image data.

In accordance with another aspect of the present disclosure, an object recognition method in an electronic device is provided. The object recognition method includes recognizing a first object in first image data, receiving a second object related to the first object from a second storage unit, storing the first object and the second object in a first storage unit, and using one or more of the first and second objects stored in the first storage unit to recognize an object in second image data.

In accordance with another aspect of the present disclosure, an object recognition method in an electronic device is provided. The object recognition method includes sending first image data to an external electronic device configured to have a first database to recognize a first object in the first image data, wherein information indicating a second database smaller than the first database is also sent to the external electronic device while the first image data is sent to the external electronic device.

In accordance with another aspect of the present disclosure, an object recognition method in an electronic device is provided. The object recognition method includes receiving first image data and information indicating a first database from an external electronic device, searching a second database larger than the first database for a second object related to a first object in the first image data and storing the first and second objects in the first database, and using one or more of the first and second objects stored in the first database to recognize an object in second image data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may have a communication function. For example, the electronic device may include a smartphone, a tablet Personal Computer (PC), a mobile phone, a video phone, an electronic book (e-book) reader, a desktop PC, a netbook computer, a Personal Digital Assistant (PDA), a Portable Multimedia Player, an MP3 player, a mobile health-care appliance, an electronic bracelet, an electronic necklace, an electronic accessory, a camera, a wearable device, an electronic clock, a wrist watch, a home appliance (e.g., refrigerator, air conditioning system, vacuum cleaner, oven, microwave, washing machine, air purifier, etc.), an artificial intelligence robot, a television, a Digital Video Disk (DVD) player, an audio system, a medical system (e.g., Magnetic Resonance Angiography (MRA), Magnetic Resonance Imaging (MRI), Computed Tomography (CT), moving camera, ultra sound device, etc.), a navigation system, a Global Positioning System (GPS) receiver, an Event Data Recorder (EDR), a Flight Data Recorder (FDR), a set-top box, a TV box (e.g., Samsung HomeSync™, AppleTV™, or Google TV™), an electronic dictionary, a vehicle infotainment system, an electronic equipment for a ship (e.g., navigation system for ship, gyro compass, etc.), an avionics device, a security device, an electronic cloth, electronic key, a camcorder, a game console, a Head-Mounted Display (HMD), a flat panel display device, an electronic frame, an electronic album, a part of furniture, a communication function of a building/structure, an electronic board, an electronic signature receiving device, a wearable device, a projector, or one or more combinations thereof. It will be obvious to a person of ordinary skill people in the art that the electronic device is not limited to the aforementioned examples.

Figure 1:
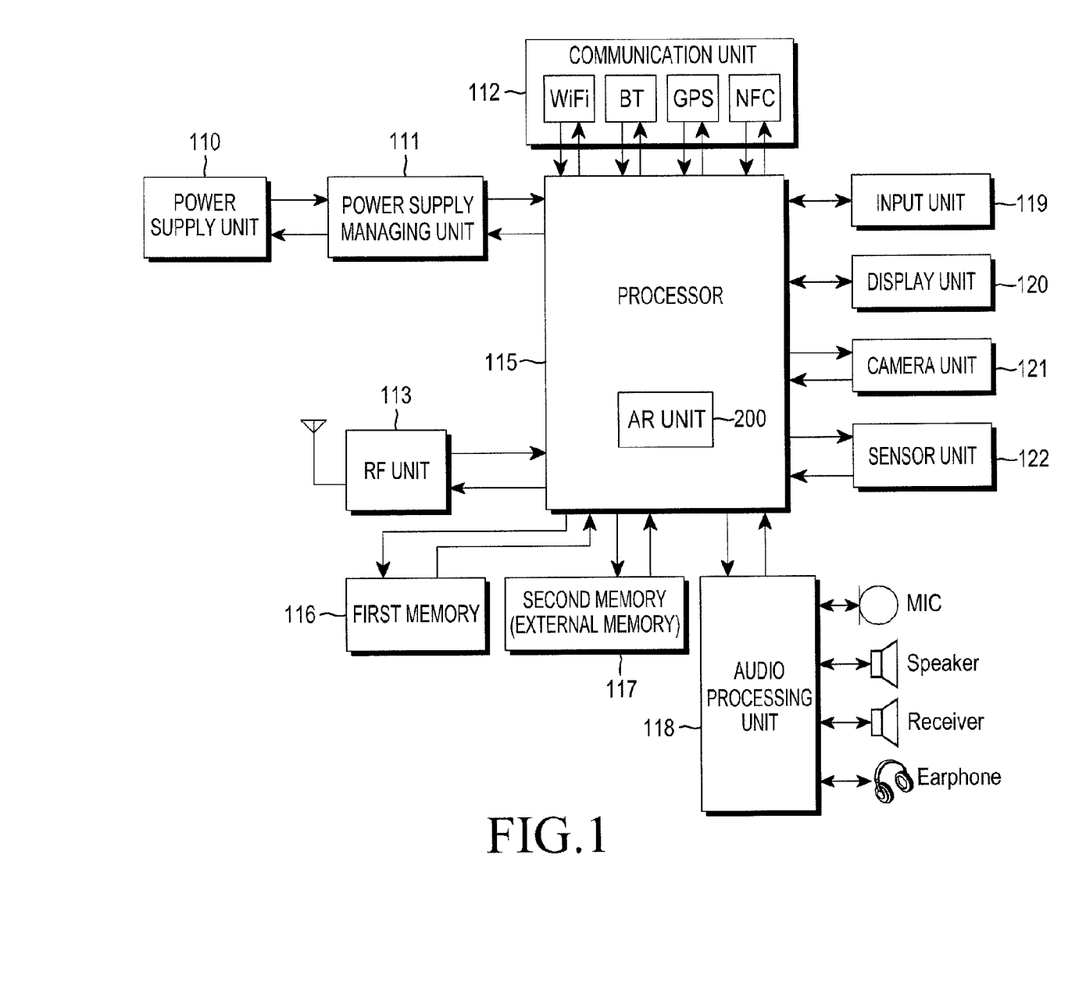
FIG. 1 is a block diagram of an electronic device according to an embodiment of the present disclosure.

FIG. 1 is a block diagram of an electronic device according to an embodiment of the present disclosure.

Referring to FIG. 1, a power supply 110 may supply power to one or more batteries (not shown) placed inside the housing of the electronic device 100 under control of a power supply manager 111. The one or more batteries power the electronic device 100. The power supply 110 may supply the electronic device 100 with power input from an external power source (not shown) via a cable connected to a connector of the electronic device 100. The power supply 110 may also supply the electronic device 100 with power wirelessly input from the external power source through a wireless charging technology.

The power supply manager 111 may control the power supply 110 to supply power to the electronic device 100 or to receive power from the external power source, under control of a processor 115.

A communication unit 112 may connect the electronic device 100 to an external electronic device through mobile communication using at least one or more antennas (not shown), under control of the processor 115.

The communication unit 112 may include at least one of a Wireless Local Area Network (WLAN) unit and a short-range communication unit. For example, the communication unit 112 may include either the WLAN unit or the short-range communication unit, or both. The WLAN unit may be connected to the Internet in an effective range of a wireless Access Point (AP) (not shown), under control of the processor 115. The WLAN unit supports IEEE's WLAN standard IEEE802.11x. The short-range communication unit may perform short-range communication wirelessly, under control of the processor 115. The short-range communication may include Bluetooth, Infrared Data Association (IrDA), WiFi-Direct, Near Field Communication (NFC), etc.

The communication unit 112 may include a GPS unit which receives radio waves from a plurality of GPS satellites (not shown) in Earth's orbit, and may calculate the position of the electronic device 100 by using time of arrival from the GPS satellites to the electronic device 100.

A Radio Frequency (RF) unit 113 may transmit/receive wireless signals for voice calls, video conference calls, Short Message Service (SMS) messages, or Multimedia Message Service (MMS) messages to/from a cell phone (not shown), a smart phone (not shown), a tablet PC (not shown), or any other device (not shown), the phones having phone numbers entered into the electronic device 100.

The processor 115 may include a Central Processing Unit (CPU), a Graphics Processing Unit (GPU) 111, a Read Only Memory (ROM) for storing a control program to control the electronic device 100, and a Random Access Memory (RAM) for storing signals or data input from outside or for being used as a memory space for storing working results of the electronic device 100. The CPU may include a single core, dual cores, triple cores, quad cores, etc. The CPU, ROM, and RAM may be connected to each other via an internal bus.

The processor 115 may control the power supply 110, the power supply manager 111, the communication unit 112, the RF unit 113, first and second memories 116 and 117, an audio processing unit 118, an input unit 119, a display unit 120, a camera unit 121, and a sensor unit 122.

The processor 115 may include an Augmented Reality (AR) unit 200 which processes input data into AR data. Alternatively, the AR unit 200 may not be included in the processor 115 but may be separately implemented. The AR unit will be described in more detail below in connection with FIGS. 2 and 3.

In various embodiments of the present disclosure, the processor 115 may load at least one reference image data into a first storage unit in AR mode, the at least one reference image data conforming to a load condition for the first storage unit. The load condition for the first storage unit may be concerning a usage place or a usage time. For example, if the load condition for the first storage unit concerns the usage place, at least one reference data that has been used at a current location among a plurality of reference image data stored in a second storage unit may be loaded into the first storage unit. Otherwise, for example, if the load condition for the first storage unit concerns the usage time, at least one reference image data that has been used before at the same time as a current time among the plurality of reference image data stored in the second storage unit may be loaded into the first storage unit. The load condition for the first storage unit may be any condition, such as user identification, weather, or the like, which may be predetermined automatically or manually.

In various embodiments of the present disclosure, the processor 115 may detect features from first input image data received from an image generation unit, e.g., the camera unit 121. The processor 115 may remove some features having already been detected through previous tracking from the detected features by masking the features having already been detected, and generate descriptors for the remaining features.

In various embodiments of the present disclosure, if the first storage unit is updated within a certain time after the first input image data is received in the AR mode, the processor 115 may recognize a first object in the first input image data using the at least one reference image data loaded into the first storage unit.

In various embodiments of the present disclosure, if no reference image data that may identify the first object in the first input image data is found in the first storage unit, the processor 115 may search the second storage unit for reference image data including a second object associated with the first object in the first input image data. The processor 115 may store the input image data that includes the first object and the reference image data that includes the second object in the first storage unit by associating them.

In various embodiments of the present disclosure, if second input image data is received from the camera unit 121, the processor 115 may use at least one of the first input image data having the first object and the reference image data having the second object, which are stored in the first storage unit, to recognize an object in the second input image data.

Alternatively, upon receipt of the first input image data from the camera unit 121, the processor 115 may send the first input image data to an external electronic device configured to use a first database of the external electronic device to recognize the first object in the first input image data. The processor 115 may send the external electronic device information indicating a second database smaller in memory size than the first database together with the first input image data.

The information indicating the second database may refer to a load condition for the second database, indicating that particular reference image data among the plurality of reference image data stored in the first database for use in object recognition from the input image data may be loaded into the second database. The load condition for the second database may include a user identification (ID), a usage place, a usage time, etc.

For example, if the load condition for the second database concerns a user ID, a processor of the external electronic device may load at least one reference image data among the entire reference image data stored in the first database into the second database, the at least one reference image data having the user ID. As another example, if the load condition for the second database concerns a usage place, a processor of the external electronic device may load at least one reference image data that has been used at a current location of the electronic device 100 among the entire reference image data stored in the first database into the second database. As yet another example, if the load condition for the second database concerns a usage time, a processor of the external electronic device may load at least one reference image data that has been used previously at the same time as a current time among the entire reference image data stored in the first database into the second database. The processor of the external electronic device may first perform recognition for the first object in the input image data on the at least one reference image data loaded according to the load condition for the second database.

If the first object of the input image data is not recognized from the at least one reference image data in the second database, the processor of the external electronic device may sequentially use the plurality of reference image data to recognize the first object in the input image data.

If the first object of the input image data is not recognized from the plurality of reference image data in the second database, the processor of the external electronic device may sequentially use the plurality of reference image data stored in the first database to recognize the first object in the input image data.

If a second object associated with the first object in the first input image data is detected from the reference image data in the first database, the processor of the external electronic device may store the first input image data that includes the first object and the reference image data that includes the second object in the second database as associated images.

Upon reception of second input image data after reception of the first input image data, the processor of the external electronic device may recognize an object in the second input image data, using at least one of the first input image data that includes the first object and the reference image data that includes the second object, which are stored in the second database.

Like the processor 115 of the electronic device 100, the processor of the external electronic device may also have the ability to perform AR processing.

In various embodiments of the present disclosure, if the second database is smaller in memory size than the first database, the second database may be a cache, and otherwise, if the second database is larger than the first database, the first database may be a cache.

Furthermore, in various embodiments of the present disclosure, if the electronic device 100 has a communication capability and is directly operated by the user, the external electronic device may be a server, and otherwise, if the external device has a communication capability and is directly operated by the user, the electronic device 100 may be a server.

The first memory 116 may store input/output signals or data resulting from operations of the communication unit 112, RF unit 113, input unit 119, camera unit 121, sensor unit 122, and the display unit 120 used as a touch screen unit. The first memory 116 may also store applications and control programs for controlling the electronic device 100, specifically the processor 115.

The first memory 116 in accordance with various embodiments of the present disclosure may include at least one of first and second storage units, the first storage unit including a cache and the second storage unit including a database.

The first storage unit may store digital image data in various embodiments of the present disclosure. The first and second storage units may be used for object recognition from input image data.

In various embodiments of the present disclosure, the first storage unit may receive reference image data that includes a second object associated with a first object in an input image data from the second storage unit and store the input image data including the first object and the reference image data including the second object by associating them. The first object in the input image data may include a first identifier for identifying a type of the first object, and the second object in the reference image data may include a second identifier which may be the same or related to the first identifier.

The first storage unit may include a volatile memory, a cache, or a non-volatile memory in various embodiments of the present disclosure.

The second storage unit may be a database that stores a plurality of reference image data from which a type of an object in an input image data may be identified. The second storage unit may be external to the electronic device 100.

The second memory 117 may be an external memory that may be attached to or detached from the electronic device 100, and may store input/output signals or data resulting from operations of the communication unit 112, RF unit 113, input unit 119, camera unit 121, sensor unit 122, and the display unit 120 used as a touch screen unit.

The audio processing unit 118 may include, for example, a transmitter that encodes and modulates signals for transmission and a receiver that demodulates and decodes a received signal, and may be comprised of a modem and a codec. The codec includes a data codec for processing, e.g., packet data and an audio codec for processing an audio signal, such as voice. The audio processing unit 118 may output an audio signal output by the audio codec to a speaker or earphone connected to the electronic device 100, or send an audio signal generated by a microphone or the receiver to the processor 115 through the audio codec.

The input unit 119 may have touch inputs made by user on the display unit 120 used as a touch screen unit, and touch inputs made by a touch pen.

The input unit 119 may receive key inputs from the user to control the electronic device 100. The input unit 119 may include a mechanical keypad (not shown) formed in the electronic device 100, or a virtual keypad (not shown) displayed on the display unit 120. The mechanical keypad formed in the electronic device 100 may be excluded depending on the performance or structure of the electronic device 100.

The display unit 120 may use a Liquid Crystal Display (LCD), in which case the display unit 120 may include an LCD controller, a memory for storing the image frame data, and an LCD display device. If implemented as a touchscreen, the LCD of the display unit 120 may serve as an input unit as well, in which case a virtual keypad may be displayed on the display unit 160. Where the display unit 120 is implemented as the touchscreen, the display unit 160 may be comprised of Touch Screen Panels (TSPs) having a plurality of sensor panels. The sensor panels may include capacitive sensor panels that may recognize a person's touches and electromagnetic sensor panels that may detect finer touches, e.g., made by a touch pen.

The camera unit 121 may be an image generating device, including at least one of first and second cameras for capturing still and video images under control of the controller 110. Furthermore, the first or second camera may include an auxiliary light source (e.g., a flash which is not shown) for providing an amount of light as required for photography. The first camera may be placed on the front of the electronic device 100 while the second camera may be placed on the rear of the electronic device 100. Alternatively, the first and second cameras are arranged adjacent to each other (e.g., a distance between the first and second cameras may be within a range between 1 to 8 cm), capturing 3-dimensional (3D) still images or 3D video images.

The sensor unit 122 includes at least one sensor for detecting a status of the electronic device 100. For example, the sensor unit 122 may include a proximity sensor for detecting proximity of a user to the electronic device 100, an illumination sensor (not shown) for detecting an amount of ambient light of the electronic device 100, a motion sensor (not shown) for detecting the motion of the electronic device 100 (e.g., rotation of the electronic device 100, acceleration or vibration applied to the electronic device 100), a geomagnetic sensor (not shown) for detecting a direction using the geomagnetic field, a gravity sensor for detecting a direction of gravity action, and an altimeter for detecting an altitude by measuring atmospheric pressure. At least one sensor may detect a corresponding status, and generate and send a corresponding signal to the processor 115. Each sensor of the sensor unit 122 may be added or removed depending on the performance of the electronic device 100.

Figure 2:
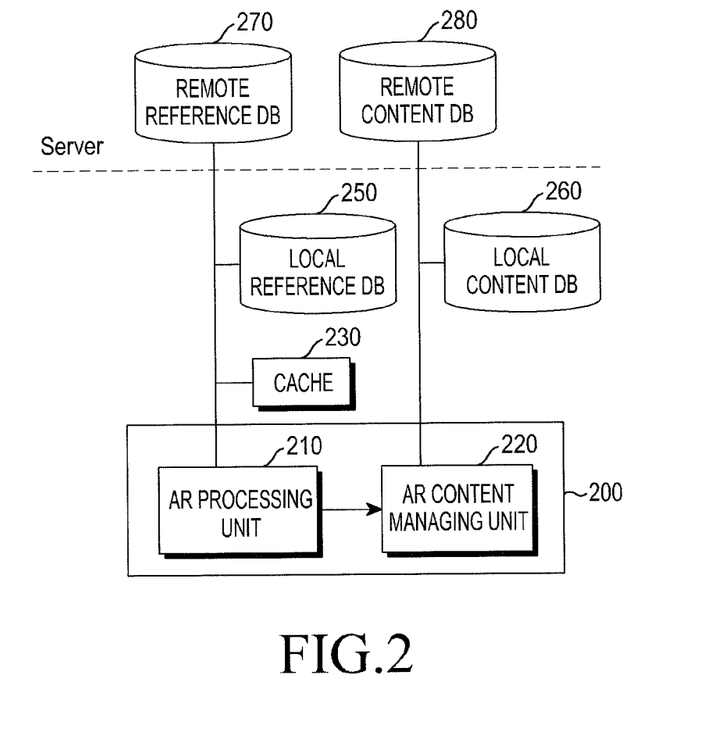
FIG. 2 is a block diagram of an Augmented Reality (AR) system according to an embodiment of the present disclosure.

FIG. 2 is a block diagram of an AR system according to an embodiment of the present disclosure.

Referring to FIG. 2, the AR system may include an AR unit 200 comprised of an AR processing unit 210 and an AR content management unit 220.

The AR processing unit 210 is a main part of the AR system, and receives input data from at least one of the camera unit 121, a media unit (not shown), an audio processing unit 118, or sensor unit 122 included in the electronic device 100. The AR processing unit 210 may employ some other components, for example, a memory, a CPU, or a GPU of the electronic device 100 to perform AR processing on the input data. To recognize a target object in the input data, the AR processing unit 210 may use a cache 230, a local reference database (DB) 250, or a remote reference DB to process the input data and output the resultant data to the AR content management unit 220.

The AR processing unit 210 may process image data received from the camera unit 121, image data/audio data of video footage received from the media unit, and audio data received from the audio processing unit 118 into data for AR. Depending on the type of the sensor data received from the sensor unit 122, the AR processing unit 210 may switch the electronic device 100 into AR mode upon detection of a movement of the electronic device 100, or may generate vibration in the AR mode while outputting image data/audio data.

The resultant data from processing the input data may include recognition information and local information regarding the target object in the input data. The local information may be used for determining a 2D and/or 3D pose of the target object if the target object is image data, and the recognition information may be used for determining a type of the target object.

The AR content management unit 220 may search the local content DB 260 or the remote content DB for content corresponding to the resultant data from processing the input data received from the AR processing unit 210, and configure and output video/audio output data based on the detected content.

In various embodiments of the present disclosure, it is assumed that the AR processing unit 210 processes input image data received from the camera unit 121 into AR image data.

Figure 3:
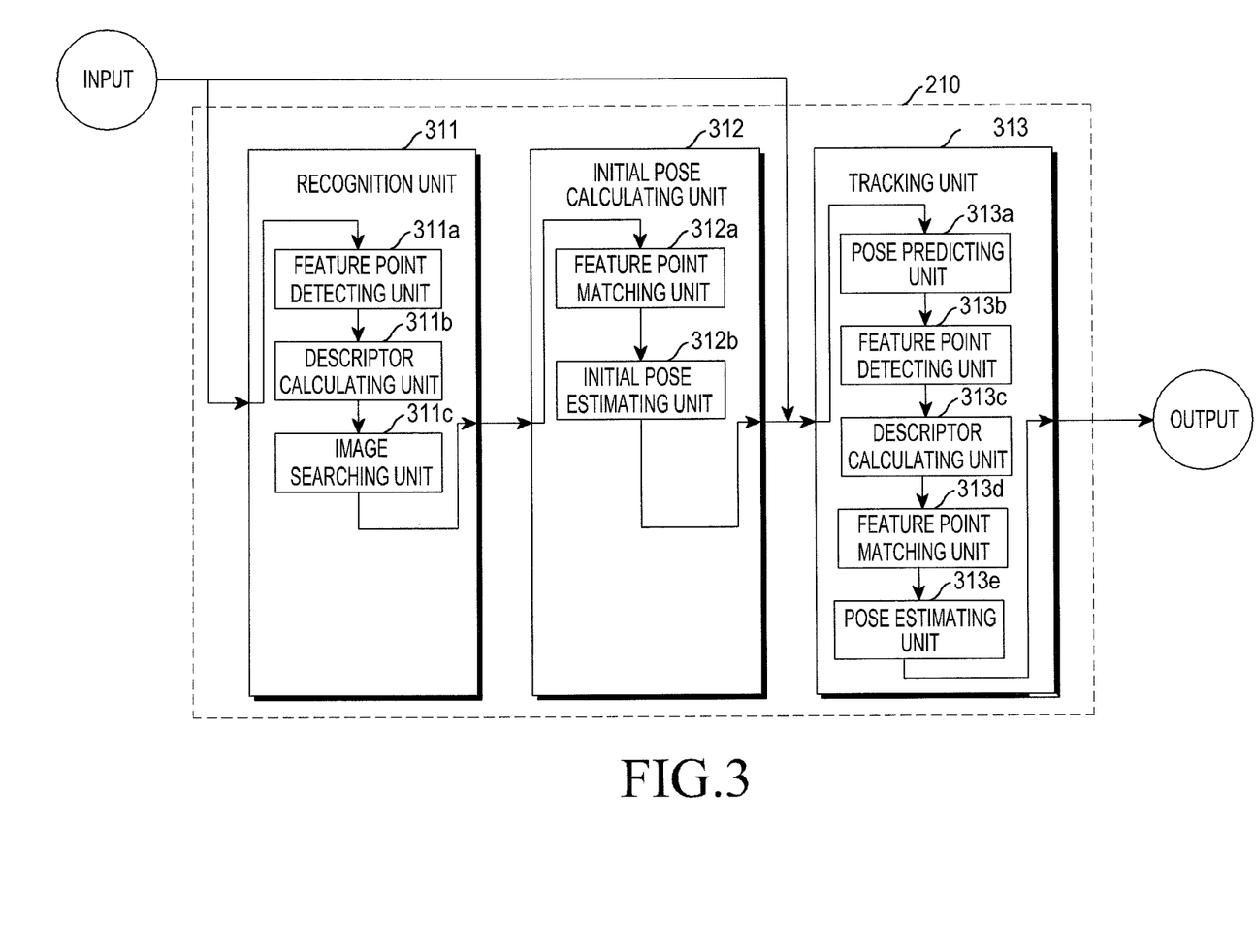
FIG. 3 is a block diagram of an AR processing unit according to an embodiment of the present disclosure.

FIG. 3 is a block diagram of an AR processing unit according to an embodiment of the present disclosure.

Referring to FIG. 3, the AR processing unit 210 may include a recognition unit 311, an initial pose calculator 312, and a tracking unit 313. Input image data may be outputted to the recognition unit 311 or the tracking unit 313, and the recognition unit 311 and the tracking unit 313 may be operated in parallel.

The recognition unit 311 may identify the type of an object in the input image data at least partially based on reference image data. The recognition unit 311 may use reference image data stored in a storage unit internal or external to the electronic device 100 for object recognition. For example, face recognition may require an external reference face database to recognize faces different from authenticated faces. Meanwhile, since a Quick Response (QR) code system generally requires only a part of particular rules from a database for QR code recognition and does not typically need to be updated dynamically, the QR code system may have internal reference data of the electronic device 100.

The recognition unit 311 may include a feature detector 311a, a descriptor calculator 311b, and an image searching unit 311c.

The feature detector 311a may detect features in an input image data received from the camera unit 121. The feature detector 311a may send the detected features to the descriptor calculator 311b.

The descriptor calculator 311b may calculate a descriptor using the detected features received from the feature detector 311a, and send the descriptor to the image searching unit 311c.

In various embodiments of the present disclosure, the descriptor calculator 311b may mask and eliminate some features having already been detected through previous tracking operation from the features received from the feature detector 311a, and calculate a descriptor for the remaining features. The descriptor calculator 311b may send the descriptor calculated using the remaining features to the image searching unit 311c.

The image searching unit 311c may use the descriptor received from the descriptor calculator 311b to search the local reference DB 250 or the remote reference DB 270 for at least one reference image data that corresponds to the input image data, and may recognize an object in the input image data using the at least one reference image data.

In various embodiments of the present disclosure, if the first storage unit is updated within a certain time after the descriptor is received from the descriptor calculator 311b, the image searching unit 311c may recognize a first object in first input image data using at least one reference image data loaded into the first storage unit 116.

In various embodiments of the present disclosure, if the first storage unit has not been updated within the certain time or any reference image data from which the first object in the first input image data is recognized has not been searched for from the first storage unit, the image searching unit 311c may search the second storage unit for reference image data that includes a second object associated with the first object in the first input image data. The image searching unit 311c may store the first input image data that includes the first object and the reference image data that includes the second object in the first storage unit by associating them.

In various embodiments of the present disclosure, if a descriptor for second input image data is received after reception of the descriptor for the first input image data, the image searching unit 311c may use at least one of the first input image data that includes the first object and the reference image data that includes the second object, which are stored in the first storage unit, to recognize an object in the second input image data.

The initial pose calculator 312 may calculate an initial pose of an object identified through feature detection from an input image data.

The initial pose calculator 312 may include a feature matching unit 312a and an initial pose estimator 312b.

The feature matching unit 312a may perform a matching operation on a feature using the calculated descriptor received from the recognition unit 311, and send matching information for the feature to the initial pose estimator 312b.

If at least one reference image data is searched for from the first storage unit to recognize the first object in the first input image data, the feature matching unit 312a may select reference image data from among the at least one reference image data which is most highly matched to the feature of the first input image data. The feature matching unit 312a may eliminate information of features of the first input image data not matched to features of the detected reference image data. Such elimination may be performed using RANdom SAmple Consensus (RANSAC) or PROgressive SAmple Consensus (PROSAC) algorithm which applies geometrical constraints.

The initial pose estimator 312b may estimate the initial pose of an object in the input image data based on the feature matching information received from the feature matching unit 312a.

The tracking unit 313 may dynamically track pose changes of an object in each of at least one input image data sequentially received from the camera unit 121.

The tracking unit 313 may dynamically calculate the pose change of the object by obtaining initial information based on which an initial pose of the object of the input image data may be estimated from the initial pose calculator 312, and subsequently continuing to track the object in each of the at least one input image data sequentially received. The tracking unit 313 may output recognition information indicating a type of the object and local information indicating a pose of the object in each of the at least one input image data sequentially received.

The tracking unit 313 may include a pose predictor 313a, a feature detector 313b, a descriptor calculator 313c, a feature matching unit 313d, and a pose estimator 313e.

Based on an estimated pose of an object in each of at least one input image data, the pose predictor 313a may predict a pose of the object in subsequent input image data.

The feature detector 313b may detect features from input image data sequentially received after estimation of the initial pose of the object in the input image data, and send the detected features to the descriptor calculator 313c.

The descriptor calculator 313c may calculate a descriptor using the detected features received from the feature detector 313b, and send the descriptor to the feature matching unit 313d.

The feature matching unit 313d may perform a matching operation on features, using the descriptor received from the descriptor calculator 313c, and send feature matching information to the pose estimator 313e.

The pose estimator 313e may dynamically estimate a pose change of an object in each of the at least one input image data sequentially received, based on the feature matching information for the features received from the feature matching unit 313d, and may output recognition information indicating a type and pose of the object in each input image data.

Although it is illustrated that the AR unit 200 (or referred to as the AR system) included in the processor 115 performs AR processing in the electronic device 100 according to various embodiments of the present disclosure, the processor 115 itself may perform the same AR processing.

Operation of the electronic device 100 for fast object recognition from input image data will now be described in connection with FIGS. 4 to 8.

Figure 4A:
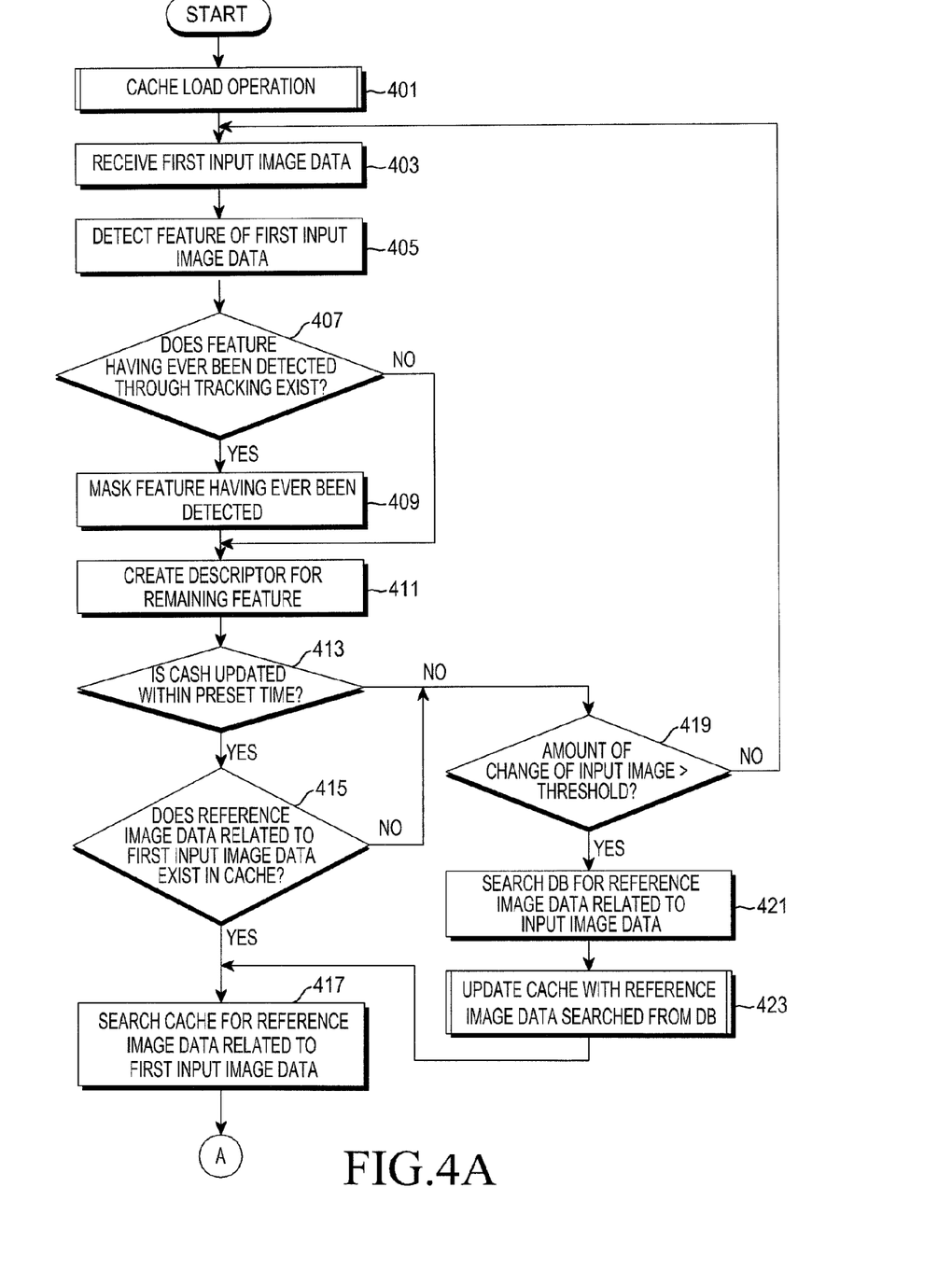
FIGS. 4A and 4B are flowcharts illustrating an operation of recognizing an object from input image data in an electronic device according to an embodiment of the present disclosure.
Figure 4B:
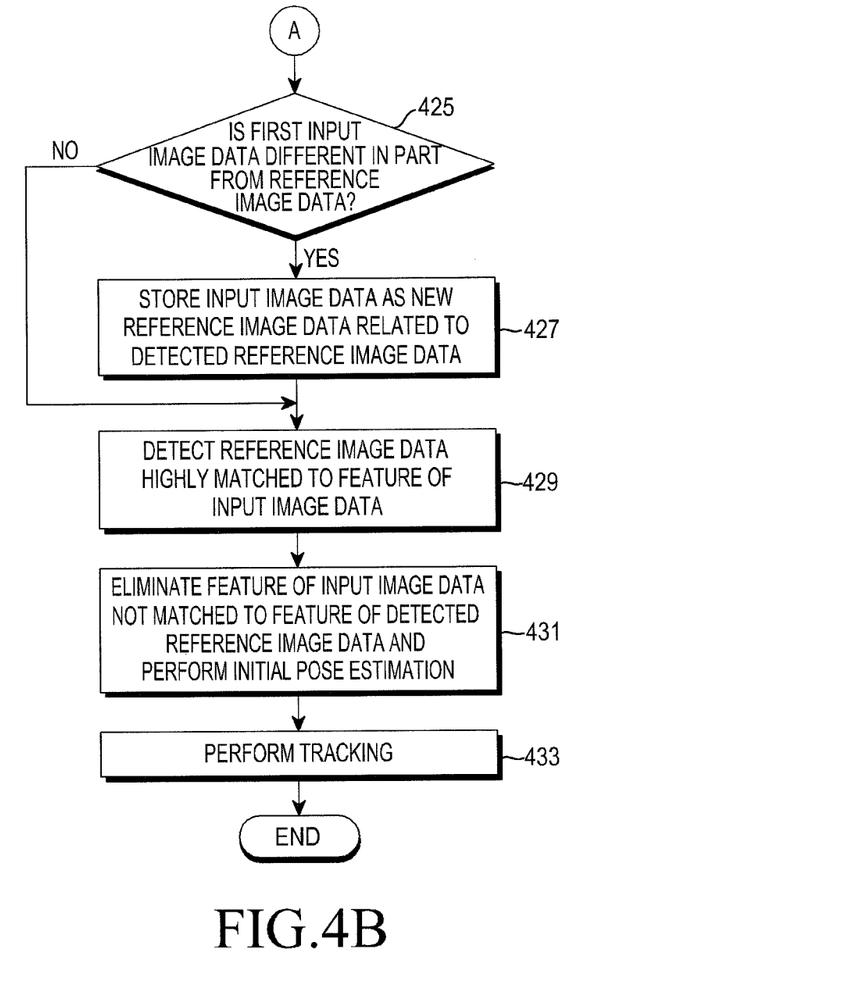
Figure 5:
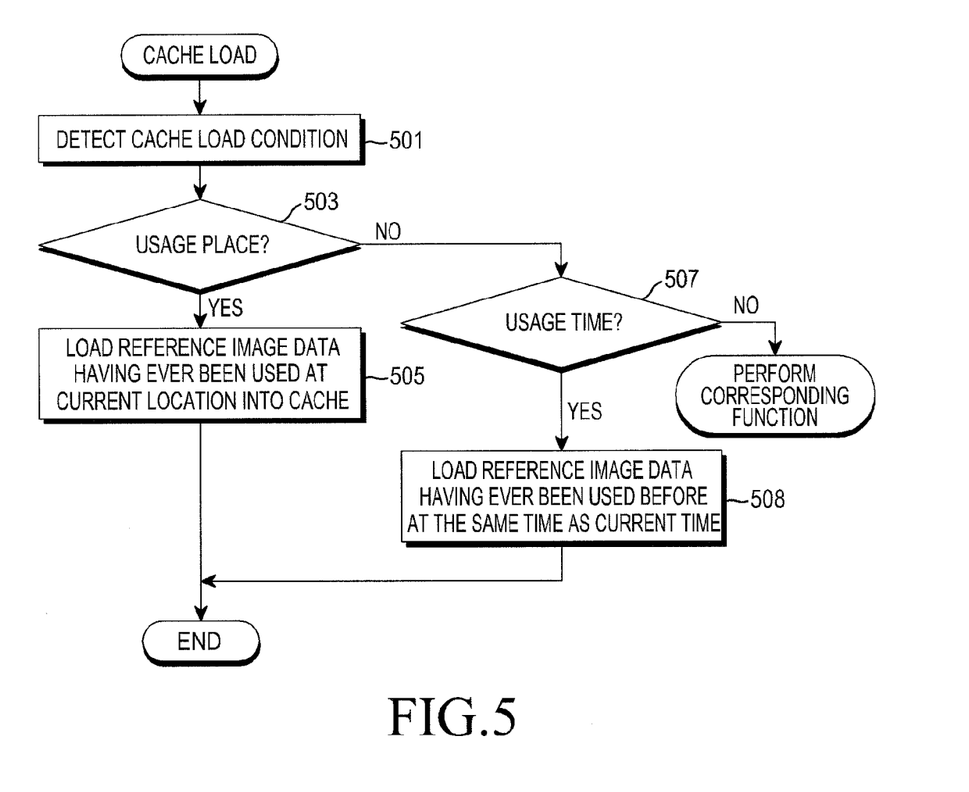
FIG. 5 is a flowchart illustrating a cache load operation in object recognition from input image data in an electronic device according to an embodiment of the present disclosure.
Figure 6:
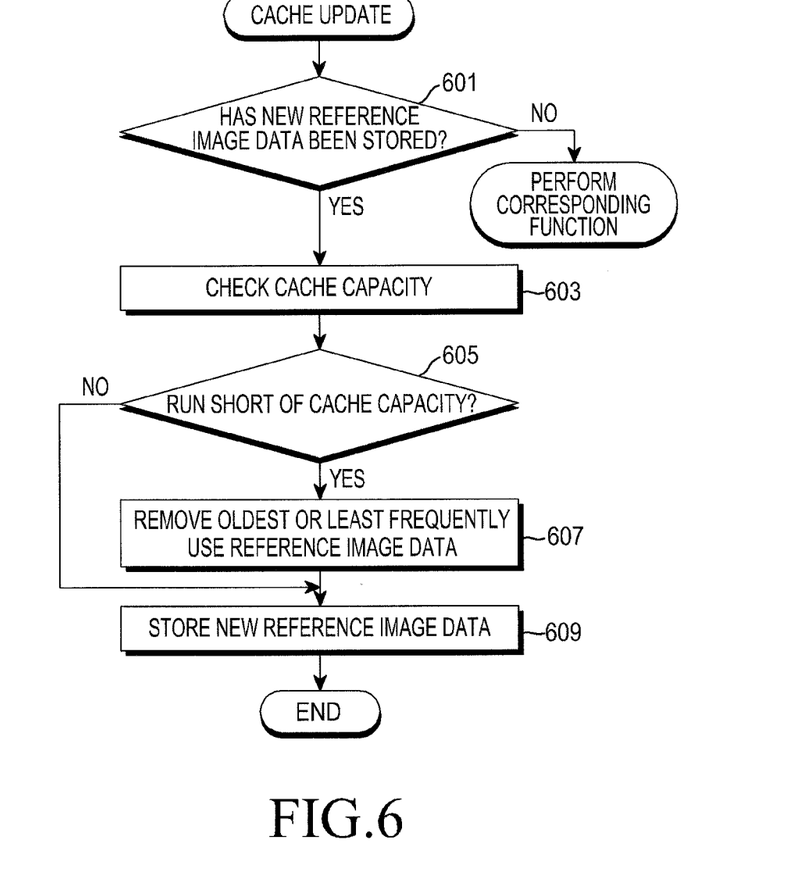
FIG. 6 is a flowchart illustrating a cache update operation in object recognition from input image data in an electronic device according to an embodiment of the present disclosure.
Figure 7A:
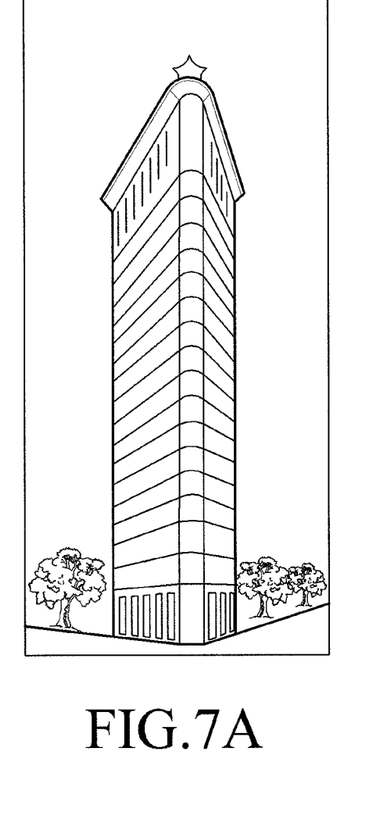
FIGS. 7A and 7B illustrate a cache update operation in object recognition from input image data in an electronic device according to an embodiment of the present disclosure.
Figure 7B:
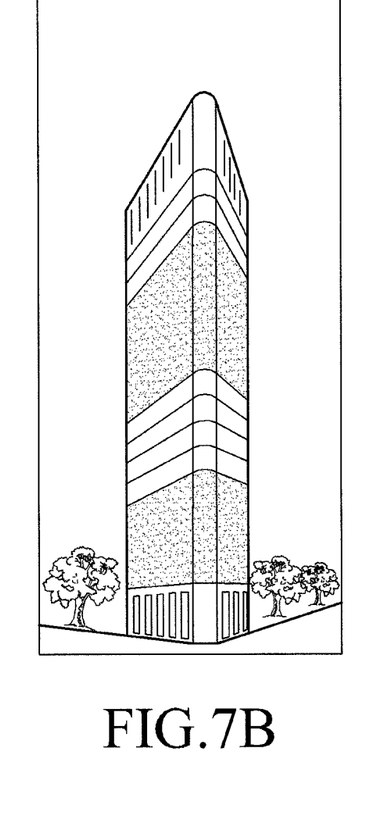

FIGS. 4A and 4B are flowcharts illustrating an operation of recognizing an object from input image data in an electronic device, according to an embodiment of the present disclosure. FIG. 5 is a flowchart illustrating a cache load operation in object recognition from input image data in an electronic device according to an embodiment of the present disclosure. FIG. 6 is a flowchart illustrating a cache update operation in object recognition from input image data in an electronic device according to an embodiment of the present disclosure. FIGS. 7A and 7B illustrate a cache update operation in object recognition from input image data in an electronic device according to an embodiment of the present disclosure. In various embodiments of the present disclosure as illustrated in FIGS. 4A to 7, it is assumed that a first storage unit serves as a cache, given that the electronic device 100 uses first and second storage units for object recognition from input image data.

The various embodiments will be described in conjunction with FIGS. 1 to 3.

Referring to FIG. 4A, if the electronic device 100 is switched into AR mode, in operation 401 the processor 115 may perform a cache load operation according to a cache load condition. The cache load operation will be described in connection with FIG. 5.

Referring to FIG. 5, in operation 501, the processor 115 may detect a cache load condition preset in the electronic device 100. In operation 503, if the processor 115 determines that the cache load condition concerns a usage place, the processor 115 may determine a current location of the electronic device 100 through a position information detecting device such as a GPS. In operation 505, the processor 115 may load into the cache reference image data that has been used at the current location of the electronic device 100 from among at least one reference image data stored in the database.

In operation 507, if the processor 115 determines that the cache load condition concerns a usage time, in operation 508, the processor 115 may load into the cache reference image data that has been used at the same moment before as the current time among at least one reference image data stored in the database.

As a result, at least one reference image data may be loaded into the cache, and referring back to FIG. 4A, in operation 403, if the processor 115 determines that a first input image data has been received from the camera unit 121, the processor 115 may send the first input image data to the recognition unit 311.

In operation 405, the feature detector 311a of the recognition unit 311 may detect features from the first input image data and send the features to the descriptor calculator 311b.

In operation 407, the descriptor calculator 311b may determine whether there are features that have been detected through previous tracking among the received features for the first input image data. In operation 407, if it is determined that there are features that have been detected through previous tracking among the received features for the first input image data, in operation 409, the descriptor calculator 311b may mask and eliminate the features that have been detected from among the features for the first input image data. In operation 411, the descriptor calculator 311b may calculate a descriptor using the remaining features after the elimination. The descriptor calculator 311b may send the descriptor calculated using the remaining features to the image searching unit 311c.

In operation 413, the image searching unit 311c may determine whether the cache has been updated within a certain time. In operation 413, if the image searching unit 311c determines that the cache has been updated within a certain time, in operation 415, the image searching unit 311c may recognize a first object in the first input image data using at least one reference image data stored in the cache. In operation 415, the image searching unit 311c may also use the descriptor for the first input image data to determine whether at least one reference image data that includes a second object related to the first object in the first input image data is found among the reference image data loaded into the cache.

In operation 415, if the image searching unit 311c determines that reference image data that includes a second object related to the first object in the first input image data is found in the cache, in operation 417, the image searching unit 311c may detect at least one reference data that includes the second object. In operation 417, the image searching unit 311c may recognize the first object in the first input image data based on identification information for the detected reference image data. For example, if the identification information for the detected reference image data indicates "AAA building," the image searching unit 311c may recognize that the object in the first input image data is the "AAA building."

Referring again to operation 413, if the image searching unit 311c determines that the cache has not been updated within a certain time, in operation 419, the image searching unit 311c may compare an amount of change of the first input image data with a threshold. In operation 419, if the image searching unit 311c determines that the amount of change of the first input image data is greater than or equal to the threshold, in operation 421 the image searching unit 311c may use the descriptor for the first input image data to detect reference image data that includes a second object related to the first object in the first input image data among at least one reference image data stored in the database. In operation 423, the image searching unit 311c may update the cache by storing the reference image data found from the database in the cache.

Referring again to operation 419, if the image searching unit 311c determines that the amount of change of the first input image data is less than the threshold, the image searching unit 311c may wait until a descriptor for new input image data is received.

Referring again to operation 415, if the image searching unit 311c determines that no reference image data that includes a second object related to the first object in the first input image data is found in the cache, the process proceeds to operation 419.

A cache update operation in which at least one reference image data detected in the database is stored in the cache, as described in operation 423, will be described below in more detail in connection with FIG. 6.

Referring to FIG. 6, in operation 601, the image searching unit 311*c* may determine whether new reference image data, e.g., at least one reference image data found from the database has been stored in the cache. In operation 601, if the image searching unit 311*c* determines that the new reference image data has been stored in the cache, in operation 603, the image searching unit 311*c* may check the capacity of the cache.

In operation 603, if the image searching unit 311*c* determines that the cache runs short of capacity to store the new reference image data, in operation 607, the image searching unit 311*c* may remove the oldest reference image data or the least frequently used reference image data from among reference image data stored in the cache.

In operation 609, the image searching unit 311*c* may store the new reference image data in the cache.

Referring to FIG. 4B, in operation 426, the image searching unit 311*c* may use the descriptor for the first input image data to compare the first object in the first input image data with a second object in the detected at least one reference image data.

In operation 426, if the image searching unit 311*c* determines that the first object in the first input image data is different from the second object in the detected at least one reference image data, in operation 427, the image searching unit 311*c* may update the cache by storing the first input image data including the first object in the cache. In operation 427, the image searching unit 311*c* may add the first input image data as new reference image data related to the reference image data having the second object to the cache.

If a descriptor for second input image data is received after reception of the descriptor for the first input image data, the image searching unit 311*c* may use at least one of the first input image data that includes the first object and at least one of reference image data that includes the second object, which are stored in the first storage unit, to recognize an object in the second input image data.

For example, FIG. 7A illustrates a first object in first input image data and FIG. 7B illustrates reference image data including a second object ("AAA building") related to the first object, which is found from the cache. With identification information of the reference image data including the second object ("AAA building") as shown in FIG. 7B, the image searching unit 311*c* may recognize the first object in the first input image data, as shown in FIG. 7A, as the "AAA building". Referring to FIGS. 7A and 7B, the first object in the first image data and the second object in the reference image data are the same object, "AAA building," but are being rendered a bit differently. The image searching unit 311*c* may store the first input image data having the first object as new reference image data in the cache where the reference image data having the second object, as shown in FIG. 7B, received from the database is stored.

Referring again to FIG. 4B, in operation 429, the feature matching unit 312*a* of the initial pose calculator 312 may use the descriptor for the first input image data to detect any reference image data that has features most highly matched with the first input image data, among the at least one reference image data found in operation 417.

In operation 431, the feature matching unit 312*a* may eliminate information of features of the first input image data that are not matched to features of the detected reference image data. Such elimination of the information of features of the first input image data that are not matched to features of the detected reference image data may be performed using RANdom SAmple Consensus (RANSAC) or PROgressive SAmple Consensus (PROSAC) algorithm which applies geometrical constraints. The initial pose estimator 312*b* may estimate the initial pose of an object in the input image data based on the feature matching information received from the feature matching unit 312*a*.

In operation 433, the tracking unit 313 may dynamically track pose changes of an object in each of at least one input image data sequentially received from the camera unit 121.

Figure 8A:
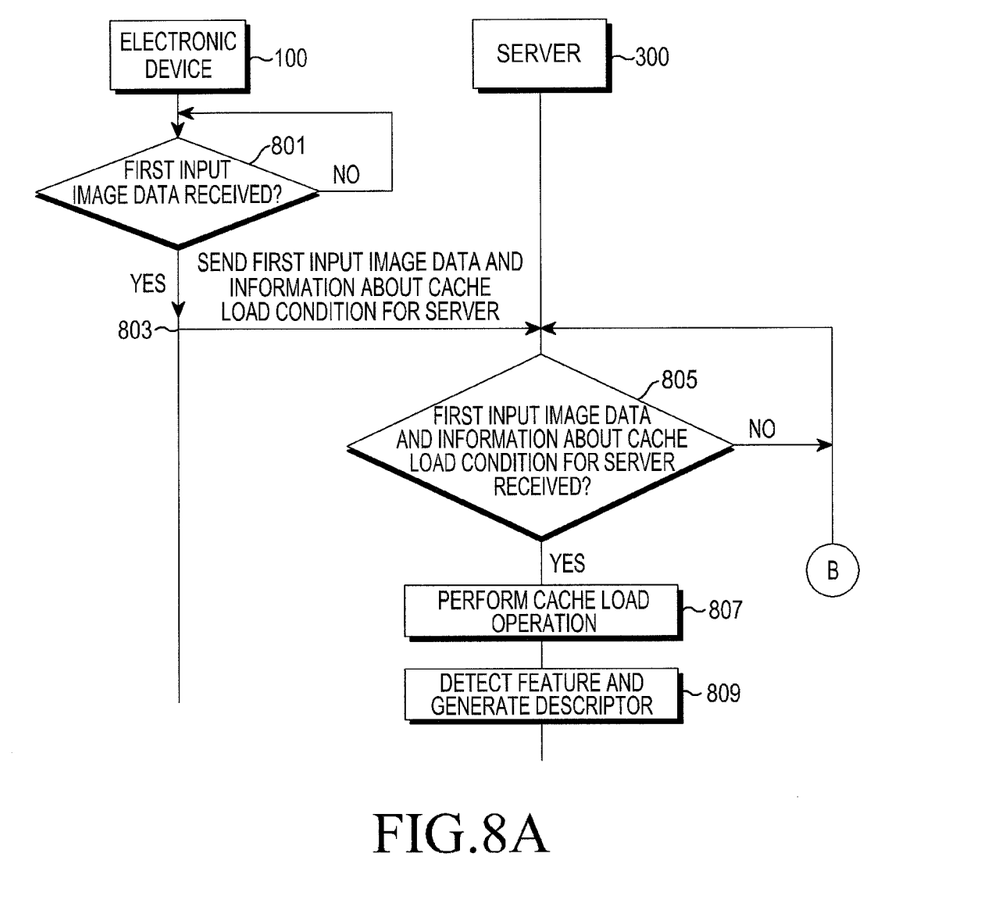
FIGS. 8A and 8B are flowcharts illustrating object recognition operation performed by an electronic device in cooperation with an external electronic device according to an embodiment of the present disclosure.
Figure 8B:
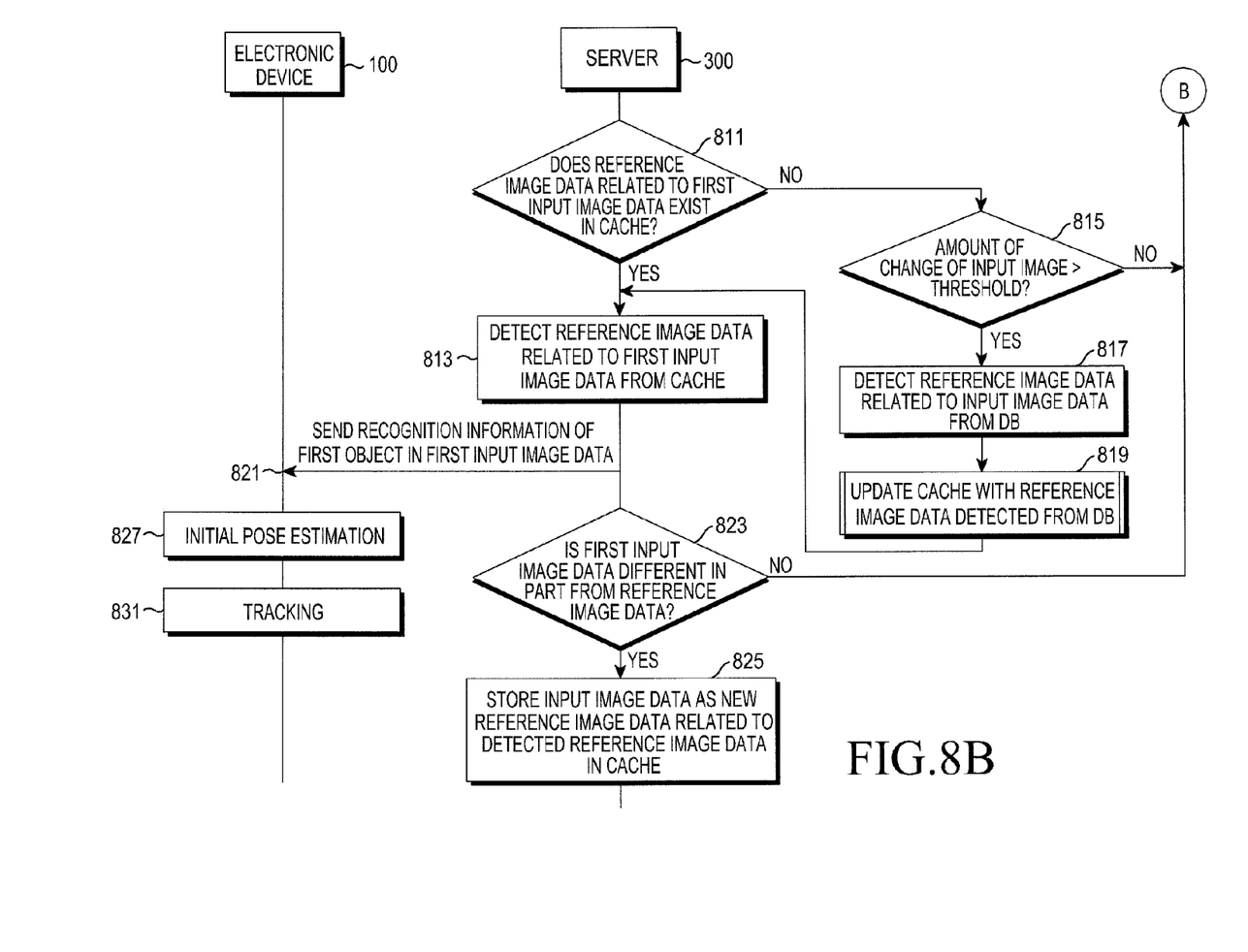

FIGS. 8A and 8B are flowcharts illustrating object recognition operation performed by an electronic device in cooperation with an external electronic device according to an embodiment of the present disclosure.

In the various embodiments shown in FIGS. 8A and 8B, it is assumed that the external electronic device is a server 300 including first and second databases, the second database being a cache.

The various embodiments of the present disclosure will be described in conjunction with FIGS. 1 to 3.

Referring to FIGS. 8A and 8B, in operation 801, the processor 115 of the electronic device 100 may determine whether first input image data has been received through the camera unit 121. In operation 801, if the processor 115 determines that the first input image data has been received, the processor 115 may send the server 300 at least one first input image data and information concerning a cache load condition for the server 300.

In operation 805, a processor of the server 300 may determine whether the at least one first input image data and the information concerning the cache load condition for the server 300 have been received from the electronic device 100. In operation 805, if the processor of the server 300 determines that at least one of the first input image data or the information concerning the cache load condition for the server 300 has been received from the electronic device 100, the processor of the server 300 may load reference image data into the cache based on the information concerning the cache load condition. In operation 807, the processor of the server 300 may search the first database of the server 300 for at least one reference image data based on the cache load condition (e.g., user ID, usage place, usage time, etc.) and store the at least one reference image data in the cache, which is the second database of the server 300.

In operation 809, the processor of the server 300 may detect features from the received first input image data and use the features to calculate a descriptor for the first input image data.

Referring to FIG. 8B, in operation 811, the processor of the server 300 may recognize a first object in the first input image data, using at least one reference image data loaded into the cache of the server 300. In operation 811, the processor of the server 300 may also use the descriptor for the first input image data to determine whether at least one reference image data that includes a second object related to the first object in the first input image data is found among reference image data loaded into the cache.

In operation 811, if the processor of the server 300 determines that there is at least one reference image data that includes the second object related to the first object in the cache, in operation 813, the processor may detect the at least one reference image data that includes the second object. In operation 813, the processor of the server 300 may recognize the first object in the first input image data based on identification information regarding the detected at least one reference image data.

In operation 811, if the processor of the server 300 determines that there is no reference image data that includes the second object related to the first object in the first input image data in the cache, in operation 815, the processor may compare an amount of change of the first input image data with a threshold. In operation 815, if the processor of the server 300 determines that the amount of change of the first input image data is greater than or equal to the threshold, in operation 817, the processor may use the descriptor for the first input image data to search the database (first database) of the server 300 for at least one reference image data that includes a second object related to the first object in the first input image data. In operation 819, the processor of the server 300 may update the cache by storing the at least one reference image data found in the database of the server 300 in the cache, and the process goes to operation 813.

In operation 815, if the processor of the server 300 determines that the amount of change of the first input image data is less than the threshold, the processor may wait until a descriptor for new input image data is received from the electronic device 100.

In operation 821, the processor of the server 300 may send information concerning the first object in the first input image data recognized in operation 813 to the electronic device 100.

In operation 823, the processor of the server 300 uses the descriptor for the first input image data to compare the first object in the first input image data with the second object in the detected at least one reference image data.

In operation 823, if the processor of the server 300 determines that the first object in the first input image data is different in part from the second object in each of the detected at least one reference image data, in operation 825, the processor may update the cache by storing the first input image data including the first object in the cache. In operation 825, the processor of the server 300 may add the first input image data as new reference image data related to the reference image data having the second object related to the first object to the cache of the server 300 that stores the reference image data having the second object received from the database of the server 300.

If second input image data is received from the electronic device 100 after reception of the first input image data, the processor of the server 300 may use at least one of the first input image data that includes the first object and at least one reference image data that includes the second object, which are stored in the cache, to recognize an object in the second input image data.

If information identifying the first object in the first input image data is received from the server 300, in operation 827, the initial pose calculator 312 of the electronic device 100 may estimate an initial pose of the object in the first input image data. In operation 831, the tracking unit 313 of the electronic device 100 may dynamically track pose changes of an object in each of at least one input image data sequentially received from the camera unit 121. In other embodiments, operations 827 and 831 may be performed by the processor of the server 300 as well.

According to various embodiments of the present disclosure, fast object recognition from image data may be achieved without storing in a database as many reference image data as required to recognize an object from the image data.

Various embodiments of the disclosure may be embodied as computer-readable codes on a computer-readable recording medium. The computer-readable recording medium is any data storage device that can store data which can be thereafter read by a computer system. Examples of the computer readable recording medium include ROM, RAM, Compact Disc (CD)-ROMs, magnetic tapes, floppy disks, optical data storage devices, etc. The computer readable recording medium can also be distributed over network coupled computer systems so that the computer readable code is stored and executed in a distributed fashion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a first storage unit configured to store digital image data; and
a processor configured to:
recognize an object in first image data using reference image data,
receive a second object related to the first object in the first image data from a second storage unit and store the first and second objects in the first storage unit, and
use one or more of the first and second objects stored in the first storage unit to recognize an object in second image data,
wherein the first storage unit is loaded with the reference image data based on a load condition of the first storage unit, and
wherein the processor is further configured to:
determine whether the load condition of the first storage unit is based on at least one of a current location and a current time, and
load the first storage unit with the reference image data according to the determination.

2. The electronic device of claim 1, wherein the first storage unit is configured to store the first and second objects by associating them.

3. The electronic device of claim 2, wherein the first object includes a first identifier and the first storage unit includes a second identifier that is the same as or related to the first identifier.

4. The electronic device of claim 1, wherein the first storage unit comprises a non-volatile memory.

5. The electronic device of claim 1, wherein the second storage unit is located external to the electronic device.

6. The electronic device of claim 1, wherein the second storage unit is located inside the electronic device.

7. An electronic device comprising:
a processor configured to:
process first image data,
send the first image data to an external electronic device configured to have a first database,
recognize a first object in the first image data, using reference image data, and
send information indicating a second database smaller than the first database to the external electronic device,
wherein the second database is loaded with the reference image data according to a load condition of the second database, and
wherein the processor is further configured to:
determine whether the load condition of the second database is based on at least one of a current location and a current time, and load the second database with the reference image data according to the determination.

8. An electronic device comprising:
a processor configured to:
process image data,
receive first image data and information indicating a first database from an external electronic device,
search a second database greater than the first database for a second object related to a first object in the first image data and store the second object in the first database,
store the first object in the first database, and
use one or more of the first and second objects stored in the first database to recognize an object in second image data using reference image data,
wherein the first database is loaded with the reference image data according to a load condition of the first database, and
wherein the processor is further configured to:
determine whether the load condition of the first database is based on at least one of a current location and a current time, and
load the first database with the reference image data according to the determination.

9. The electronic device of claim 8, wherein the information indicating the first database includes a user identification.

10. An object recognition method in an electronic device including a processor, the object recognition method comprising:
recognizing, by the processor, a first object in first image data using reference image data;
receiving a second object related to the first object from a second storage unit;
storing the first object and the second object in a first storage unit; and
using, by the processor, one or more of the first and second objects stored in the first storage unit to recognize an object in second image data,
wherein the first storage unit is loaded with the reference image data based on a load condition of the first storage unit, and
wherein the processor determines whether the load condition of the first storage unit is based on at least one of a current location and a current time, and loads the first storage unit with the reference image data according to the determination.

11. The object recognition method of claim 10, wherein the first and second objects are associated and stored in the first storage unit.

12. The object recognition method of claim 11, wherein the first object includes a first identifier, and
wherein the second object stored in the first storage unit includes a second identifier that is the same as or related to the first identifier.

13. The object recognition method of claim 10, wherein the first storage unit comprises a non-volatile memory.

14. The object recognition method of claim 10, wherein the second storage unit is located external to the electronic device.

15. The object recognition method of claim 10, wherein the second storage unit is located inside the electronic device.

16. The object recognition method of claim 10, wherein the first image data is generated by an image generating unit of the electronic device.

17. An object recognition method in an electronic device including a processor, the object recognition method comprising:
sending, by the processor, first image data to an external electronic device configured to have a first database to recognize a first object in the first image data using reference image data,
wherein information indicating a second database smaller than the first database is also sent to the external electronic device while the first image data is sent to the external electronic device,
wherein the second database is loaded with the reference image data according to a load condition of the second database, and
wherein the processor determines whether the load condition of the second database is based on at least one of a current location and a current time, and loads the second database with the reference image data according to the determination.

18. An object recognition method in an electronic device including a processor, the object recognition method comprising:
receiving first image data and information indicating a first database from an external electronic device;
searching a second database larger than the first database for a second object related to a first object in the first image data and storing the first and second objects in the first database; and
using, by the processor, one or more of the first and second objects stored in the first database to recognize an object in second image data using reference image data,
wherein the first database is loaded with the reference image data based on a load condition of the first database, and
wherein the processor determines whether the load condition of the first database is based on at least one of a current location and a current time, and loads the first database with the reference image data according to the determination.

19. The object recognition method of claim 18, wherein the information indicating the first database includes a user identification.

* * * * *